United States Patent
Kakino et al.

(10) Patent No.: US 6,437,534 B1
(45) Date of Patent: Aug. 20, 2002

(54) CONTROL METHOD FOR NC MACHINE TOOL

(75) Inventors: Yoshiaki Kakino, 256-5, Iwakura-hanazono-cho, Sakyo-ku, Kyoto 606-0024; Makoto Fujishima, Yamatokoriyama; Hisashi Otsubo, Okayama; Hideo Nakagawa, Itami; Yoshinori Yamaoka, Aichi; Torao Takeshita, Tokyo, all of (JP)

(73) Assignees: Yoshiaki Kakino, Kyoto; Mori Seiki Co., Ltd., Yamatokoriyama; Yasda Precision Tools K.K., Okayama; Osaka Kiko Co., Ltd., Osaka; Yamazaki Mazak Corporation, Aichi; Mitsubishi Denki Kabushiki Kaisha, Tokyo, all of (JP)

( * ) Notice: Subject to any disclaimer, the term of this patent is extended or adjusted under 35 U.S.C. 154(b) by 0 days.

(21) Appl. No.: 09/657,592

(22) Filed: Sep. 8, 2000

(30) Foreign Application Priority Data

Sep. 10, 1999 (JP) ............................ 11-256756

(51) Int. Cl.$^7$ ............................ G05B 19/18; B23Q 5/22
(52) U.S. Cl. ........................ 318/569; 318/600; 318/632
(58) Field of Search .......................... 318/39, 569, 570, 318/571, 600, 601, 625, 632

(56) References Cited

U.S. PATENT DOCUMENTS 4,353,018 A * 10/1982 Kohzai et al. ............... 318/571
4,639,653 A * 1/1987 Anderson et al. ............ 318/599
4,879,660 A * 11/1989 Asakura et al. ............ 318/39 X
5,184,053 A * 2/1993 Maruo et al. ............... 318/571
5,654,894 A * 8/1997 Tsutsui ................... 318/571 X

FOREIGN PATENT DOCUMENTS

| JP | 01205907 A | 8/1989 |
| JP | 07-051992 | 2/1995 |
| JP | 07-075936 | 3/1995 |
| JP | 07-195256 | 8/1995 |

* cited by examiner

Primary Examiner—Bentsu Ro

(57) ABSTRACT

A control method for an NC machine tool is provided which ensures a high precision of the contouring control, and allows for extension of the drill life, and reduction in machining time. The control method comprises: generating an operation command signal on the basis of the machining program and a time constant; generating a velocity command signal by multiplying a deviation of a present position signal fed back from the feed drive system (106) from the generated operation command signal by a position loop gain; generating an electric current command signal by multiplying a deviation of a present velocity signal fed back from the feed drive system (106) from the generated velocity command signal by a velocity loop gain; and controlling a drive motor of the feed drive system (106) on the basis of the generated electric current command signal for driving thereof, wherein a machining mode is determined from the machining program and, if the machining mode is a drilling mode, at least one of the operation command signal, the velocity command signal and the electric current command signal is modified when the feed drive system (106) is driven to be retracted opposite to a drilling feed direction.

6 Claims, 15 Drawing Sheets

CONTROL METHOD FOR NC MACHINE TOOL

BACKGROUND OF THE INVENTION

1. Field of the Invention

The present invention relates to a method of controlling the operation of a feed drive system and a spindle of an NC machine tool and, more particularly, to a control method which effectively reduces the wear and abrasion of a drill edge during a drilling with a drill.

2. Description of the Prior Art

In recent years, NC machine tools have been designed so that a spindle and a feed drive system operate at higher speeds and at higher accelerations. It is known that the higher-speed and higher-acceleration operation extends the drill life. This is supposedly because the drill of such a high-speed and high-acceleration machine tool is subjected to a slow feed process for a shorter period of time when retracted opposite to a drilling feed direction, and a drill edge is kept in friction contact with the bottom of a drilled hole for a shorter period of time than in a conventional-speed NC machine tool. This will be explained in detail with reference to FIG. 14. FIG. 14 shows velocity fluctuations in the feed rate of the drill in the vicinity of the bottom of the hole in the high-speed and high-acceleration machine tool (solid line) and in the conventional machine tool (broken line) Provided that the drill edge is in friction contact with the bottom of the hole when the feed rate is within a range of ±2 m/min, the friction contact lasts for about 0.13 second in the case of the high-speed and high-acceleration machine tool and for 0.26 second in the case of the conventional machine tool, as shown in FIG. 14. In the conventional machine tool, the period during which the drill edge is kept in friction contact with the bottom of the hole is longer by 0.13 second than in the high-speed and high-acceleration machine tool, so that the drill life is short.

The operations of the spindle and the feed drive system are typically controlled by a controller as shown in FIG. 15. As shown, the controller 100 includes a machining program storing section 101, a program analyzing section 102, a command generating and distributing section 103, a feed drive controlling section 104, and a spindle controlling section 105. The machining program storing section 101 stores a machining program preliminarily created. The program analyzing section 102 analyzes the machining program stored in the machining program storing section 101 to pick out commands concerning the rotation of the spindle, and the feed rate and feed position of the feed drive system from the machining program, and then sends a command signal concerning the rotation of the spindle to the spindle drive controlling section 105 and command signals indicative of the feed rate and feed position of the feed drive system 106 to the command generating and distributing section 103.

The spindle drive controlling section 105 controls a spindle drive system 107 according to the received command signal for driving thereof. The command generating and distributing section 103 determines target feed positions at regularly spaced time points for the operation of the feed drive system 106 on the basis of the received command signals and a predetermined time constant to generate operation command signals indicative of the respective target feed positions, and then transmits the operation command signals one after another to the feed drive controlling section 104. The feed drive controlling section 104 generates a velocity command signal by multiplying a deviation of a present position signal fed back from the feed drive system 106 from a received operation command signal by a position loop gain $K_p$. Then, the feed drive controlling section 104 generates an electric current command signal by multiplying a deviation of a present velocity signal fed back from the feed drive system 106 from the generated velocity command signal by a velocity loop gain $K_v$. The feed drive controlling section 104 further generates an output by multiplying a deviation of a present drive electric current signal fed back from the feed drive system 106 from the generated electric current command signal by an electric current loop gain $K_I$, and then transmits the output as a drive command signal to the feed drive system 106. The operation of the feed drive system 106 is controlled on the basis of the received drive command signal. Although the single feed drive system is shown in FIG. 15, machine tools such as machining centers generally have a plurality of feed drive systems 106, and the command generating and distributing section 103 and the feed drive controlling section 104 are provided for each of the plurality of feed drive systems 106.

The NC machine tool (e.g., machining center) is adapted to perform a variety of machining operations such as end milling, boring, reaming and milling. In particular, the end milling is generally employed for contouring control, so that it is important to precisely control the respective feed drive systems 106 in order to achieve the contour of great precision. Even if the respective feed drive systems 106 are simultaneously driven, parameters including the position loop gains $K_p$, the feed velocity loop gains $K_v$ and the cutting feed time constants for the respective feed drive systems are set at the same levels in order to prevent reduction in the precision of the contouring control. In the aforesaid high-speed and high-acceleration machine tool, the machining operations are each performed at a spindle rotation speed of 20,000 to 30,000 $m^{-1}$ or greater and at a feed rate of 10 to 20 m/min or greater, so that the time constant is set at such a level that the feed drive systems 106 are each driven at an acceleration of lower than 0.1 G during the machining operation.

In the conventional machine tool, the parameters for the feed drive systems 106 are thus set mainly for the contouring control. Therefore, the parameter settings are not necessarily optimized for the drilling in order to reduce the stagnant time of the drill in the bottom of the drilled hole for reduction of the wear and abrasion of the drill and for extension of the drill life.

SUMMARY OF THE INVENTION

In view of the foregoing, it is an object of the present invention to provide a control method for an NC machine tool, which ensures a high precision of the contouring control, and allows for extension of the drill life, and reduction in machining time.

In accordance with the present invention to achieve the aforesaid object, the present control method for an NC machine tool comprises generating an operation command signal on the basis of a machining program and a time constant, generating a velocity command signal by multiplying a deviation of a present position signal fed back from the feed drive system from the generated operation command signal by a position loop gain, generating an electric current command signal by multiplying a deviation of a present velocity signal fed back from the feed drive system from the generated velocity command signal by a velocity loop gain, and controlling a drive motor of the feed drive system on the basis of the generated electric current command signal, wherein a machining mode prescribed in the machining program is determined and, if the machining mode is a drilling mode, a predetermined operation modification value is added to the operation command signal to generate the velocity command signal and then the electric current command signal, and the drive motor of the feed drive system is driven and controlled on the basis of the generated electric current signal, when the feed drive system is driven to be retracted opposite to a drilling feed direction.

With this arrangement, where the machining mode is the drilling mode, the predetermined operation modification value is added to the generated operation command signal and the generation of the velocity command signal is based on the resulting operation command signal when the feed drive system is driven to be retracted opposite to the drilling feed direction. Therefore, the feed drive system is retracted at a feed rate higher than a rapid feed rate to be employed in a non-drilling, so that a slow feed period or a stagnant time during which the drill stays in a drilled hole can be reduced when the feed direction is reversed. Thus, a drill edge is in friction contact with the bottom of the drilled hole for a shorter period of time. This extends the drill life and, in addition, reduces a machining time. After completion of every drilling, the added operation modification value is canceled.

In the aforesaid control method for driving and controlling the drive motor of the feed drive system, the machining mode prescribed in the machining program is determined and, if the machining mode is the drilling mode, a predetermined velocity modification value is added to the generated velocity command signal to generate the electric current command signal and the drive motor of the feed drive system is driven and controlled on the basis of the generated electric current signal, when the feed drive system is driven to be retracted opposite to the drilling feed direction.

With this arrangement, the predetermined velocity modification value is added to the generated velocity command signal and the generation of the electric current command signal is based on the resulting velocity command signal when the feed drive system is driven to be retracted opposite to the drilling feed direction. Therefore, the feed drive system is retracted at a feed rate higher than the rapid feed rate to be employed in the non-drilling as described above, so that the stagnant time of the drill can be reduced when the feed direction is reversed. Thus, the drill edge is in friction contact with the bottom of the drilled hole for a shorter period of time. This extends the drill life and, in addition, reduces the machining time. After completion of every drilling, the added velocity modification value is canceled.

In the aforesaid control method for driving and controlling the drive motor of the feed drive system, the machining mode prescribed in the machining program is determined and, if the machining mode is the drilling mode, the feed drive system is driven and controlled by employing a position loop gain having a greater value than a position loop gain to be employed in the non-drilling mode when the feed drive system is driven to be retracted opposite to the drilling feed direction.

With this arrangement, the velocity command signal is generated by employing the position loop gain which has a greater value than the position loop gain to be used in the non-drilling mode when the feed drive system is driven to be retracted opposite to the drilling feed direction. Therefore, the feed drive system is retracted at a feed rate higher than the rapid feed rate to be employed in the non-drilling as described above, so that the stagnant time of the drill can be reduced when the feed direction is reversed. Thus, the same effects as described above are provided. After completion of every drilling, the position loop gain is reset to an ordinary value.

In the aforesaid control method for driving and controlling the drive motor of the feed drive system, the machining mode prescribed in the machining program is determined and, if the machining mode is the drilling mode, the feed drive system is driven and controlled by employing a velocity loop gain having a greater value than a velocity loop gain to be employed in the non-drilling mode when the feed drive system is driven to be retracted opposite to the feed direction.

With this arrangement, the electric current command signal is generated by employing the velocity loop gain which has a greater value than the velocity loop gain to be used in the non-drilling mode when the feed drive system is driven to be retracted opposite to the drilling feed direction. Therefore, the feed drive system is retracted at a feed rate higher than the rapid feed rate to be employed in the non-drilling as described above, so that the stagnant time of the drill can be reduced when the feed direction is reversed. Thus, the same effects as described above are provided. After completion of every drilling, the velocity loop gain is reset to an ordinary value.

In the aforesaid control method for driving and controlling the drive motor of the feed drive system, the machining mode prescribed in the machining program is determined and, if the machining mode is the drilling mode, a bell-shaped time constant is employed as the time constant when the feed drive system is driven in the drilling feed direction, and a linear time constant is employed as the time constant when the feed drive system is driven in a retracting direction.

With this arrangement, the operation command signal is generated by employing the bell-shaped time constant when the feed drive system is driven in the drilling feed direction, and by employing the linear time constant when the feed drive system is driven in the retracing direction. The linear time constant allows for quicker rise of the feed rate than the bell-shaped time constant. Therefore, the traveling speed of the drill can be increased when the feed drive system is driven to be retracted opposite to the drilling feed direction. As a result, the stagnant time of the drill can be reduced when the feed direction of the drill is reversed. Thus, the same effects as described above are provided. After completion of every drilling, the time constant is reset from the linear time constant to the bell-shaped time constant.

In the aforesaid control method for driving and controlling the drive motor of the feed drive system, the machining mode prescribed in the machining program is determined and, if the machining mode is the drilling mode, the feed drive system is driven and controlled by reducing the time constant to be used when the feed drive system is driven in the drilling feed direction to a value smaller than a time constant to be used when the feed drive system is driven in the non-drilling mode. The term "time constant" herein means a rise time to be elapsed until the feed drive system reaches a predetermined feed rate.

With this arrangement, the time constant having a smaller value than the time constant to be employed in the non-drilling mode is employed for the generation of the operation command signal when the feed drive system is driven in the drilling feed direction. Therefore, the feed drive system is stopped at the bottom of the drilled hole at a high deceleration rate, and then its traveling direction is reversed. Thus, the stagnant time of the drill in the bottom of the hole can be reduced, so that the drill edge is in friction contact with the bottom of the hole for a shorter period of time. This extends the drill life and reduces the machining time. After completion of every drilling, the time constant is reset to an original value.

In the aforesaid control method for driving and controlling the drive motor of the feed drive system, and in a control method for controlling the rotation speed of a spindle according to the machining program, the machining mode prescribed in the machining program is determined and, if the machining mode is the drilling mode, the rotation speed of the spindle is decelerated when the feed drive system is driven to be retracted opposite to the drilling feed direction.

With this arrangement, the spindle is rotated at a lower rotation speed when the feed drive system is driven to be retracted opposite to the drilling feed direction. Therefore, a distance during which the drill edge is kept in friction contact with the bottom of the drilled hole is reduced when the feed drive system is driven to be retracted, whereby the drill life can be extended.

DETAILED DESCRIPTION OF THE PREFERRED EMBODIMENTS

Several embodiments of the present invention will hereinafter be described with reference to the attached drawings.

Figure 1:
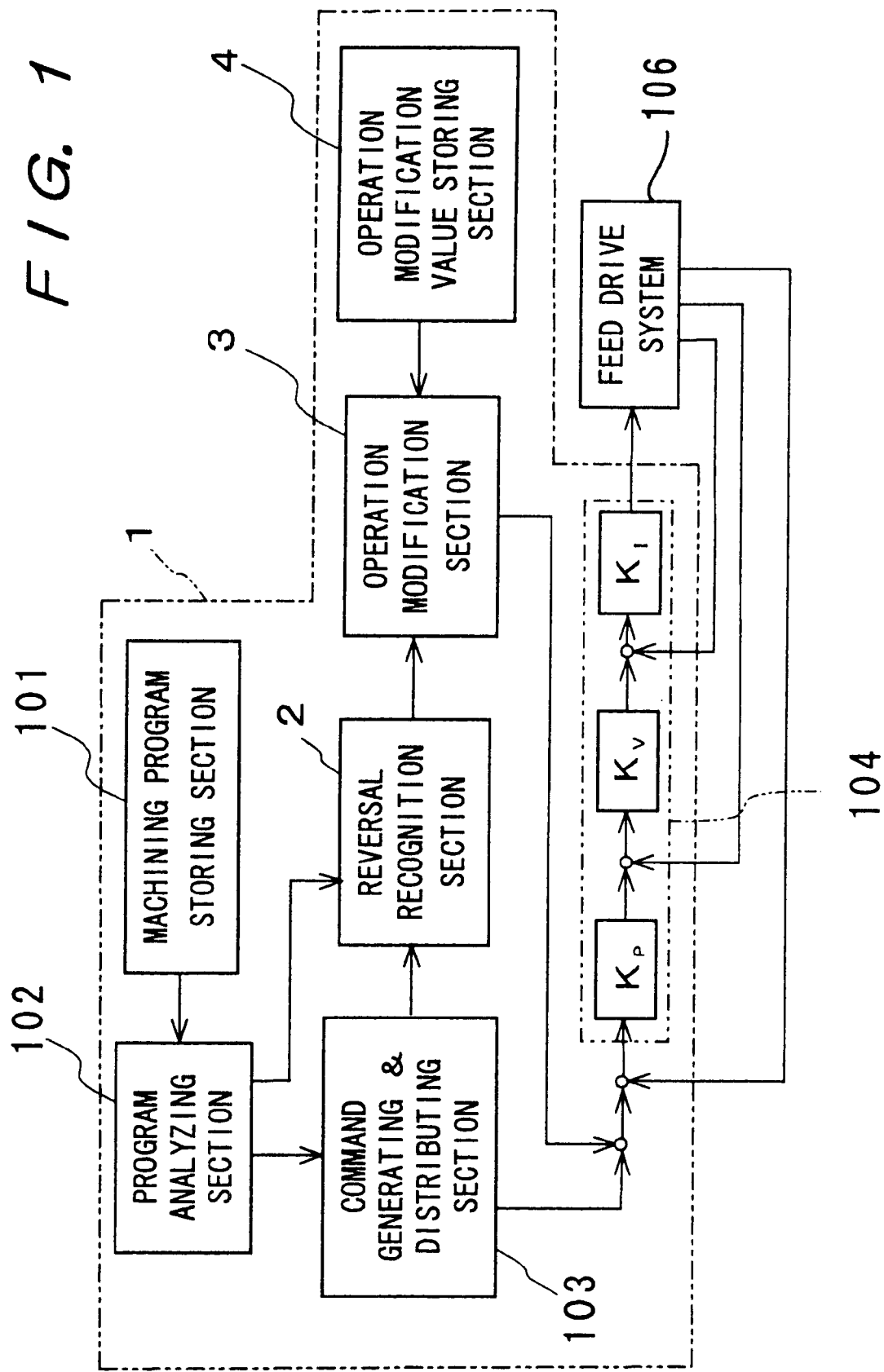
FIG. 1 is a block diagram illustrating a controller to be employed for implementing a control method according to a first embodiment of the present invention.

An explanation will be given to a first embodiment of the present invention. FIG. 1 is a block diagram schematically illustrating the construction of a controller according to the first embodiment. The controller 1 according to this embodiment includes a machining program storing section 101, a program analyzing section 102, a command generating and distributing section 103, a feed drive controlling section 104, a reversal recognition section 2, an operation modification section 3, and an operation modification value storing section 4.

The machining program storing section 101 stores a machining program preliminarily created. The program analyzing section 102 is adapted to analyze the machining program stored in the machining program storing section 101 to pick out a command concerning a feed position from the machining program, and to transmit a command signal indicative of the feed position to the command generating and distributing section 103.

The command generating and distributing section 103 is adapted to determine target feed positions at regularly spaced time points for the operation of a feed drive system 106 on the basis of the received command signal and a time constant to generate operation command signals indicative of the respective target feed positions, and to transmit the operation command signals one after another to the feed drive controlling section 104.

The feed drive controlling section 104 is adapted to generate a velocity command signal by multiplying a deviation of a present position signal fed back from the feed drive system 106 from a received operation command signal by a position loop gain $K_p$, to generate an electric current command signal by multiplying a deviation of a present velocity signal fed back from the feed drive system 106 from the generated velocity command signal by a velocity loop gain $K_v$, to generate an output by multiplying a deviation of a present driving electric current signal fed back from the feed drive system 106 from the generated electric current command signal by an electric current loop gain $K_I$, and to transmit the output as a drive command signal to the feed drive system 106. The operation of the feed drive system 106 is controlled on the basis of the received drive command signal.

The reversal recognition section 2 starts the following process upon recognition of a drilling start command picked out from the machining program by the program analyzing section 102. The reversal recognition section 2 is adapted to output a process implementation signal to the operation modification section 3 upon recognition of an operation command which is generated by the command generating and distributing section 103 for commanding to start the retraction of the feed drive system 106, and to output a process cancellation signal to the operation modification section 3 upon recognition of an operation command which is generated by the command generating and distributing section 103 for commanding to end the retraction of the feed drive system 106. The reversal recognition section 2 ends this process upon recognition of a drilling termination command picked out from the machining program by the program analyzing section 102.

The operation modification value storing section 4 stores a predetermined operation modification value. The operation modification section 3 is adapted to read the operation modification value from the operation modification value storing section 4 upon reception of the process implementation signal applied from the reversal recognition section 2, to add the operation modification value to an operation command signal generated by the command generating and distributing section 103 for modification of the operation command signal, and to input the modified operation command signal to the feed drive controlling section 104. The operation modification section 3 is further adapted to cancel the operation modification value added for the modification (through subtraction) upon reception of the process cancellation signal applied from the reversal recognition section 2, and to input the resulting operation command signal to the feed drive controlling section 104.

In the controller 1, the program analyzing section 102 picks out commands on the rotation of a spindle, the feed rate and feed position of the feed drive system 106, and the like from the machining program. Of these commands, the commands on the feed rate and feed position of the feed drive system 106 are transmitted to the command generating and distributing section 103. If the drilling start command such as defined by a so-called G-code is present in the machining program, the drilling start command is transmitted to the reversal recognition section 2.

Upon reception of the drilling start command signal, the reversal recognition section 2 starts the operation modification process, and monitors operation command signals generated by the command generating and distributing section 103. Upon recognition of the operation command for commanding to start the retraction of the feed drive system 106, the reversal recognition section 2 outputs the process implementation signal to the operation modification section 3. Upon reception of the process implementation signal, the operation modification section 3 reads the operation modification value from the operation modification value storing section 4, and modifies the operation command signal generated by the command generating and distributing section 103 by adding the operation modification value to the operation command signal. Then, the modified operation command signal is inputted to the feed drive controlling section 104.

Thus, the feed drive controlling section 104 successively generates a velocity command signal, an electric current command signal and a drive command signal on the basis of the modified operation command signal. The operation of the feed drive system 106 is controlled on the basis of the drive command signal finally generated. In the controller 1 according to this embodiment, the feed drive system 106 travels a greater distance per unit time for the retraction thereof in the drilling than in the non-drilling. Therefore, a rapid feed operation can be achieved more quickly for the retraction of the feed drive system in the drilling than in the non-drilling.

Upon recognition of completion of the retracting operation, the reversal recognition section 2 transmits the process cancellation signal to the operation modification section 3. Upon reception of the process cancellation signal, the operation modification section 3 cancels the operation modification value added for the modification. That is, the modification value is subtracted from an operation command signal currently generated by the command generating and distributing section 103, and the resulting operation command signal is inputted to the feed drive controlling section 104. Thus, the feed drive controlling section 104 successively generates a velocity command signal, an electric current command signal and a drive command signal on the basis of the operation command signal resulting from the subtraction. The operation of the feed drive system 106 is controlled on the basis of the finally generated drive command signal. Thus, the operation modification value added for the modification is canceled. The reversal recognition section 2 ends the process upon recognition of the drilling termination command picked out from the machining program by the program analyzing section 102.

In the controller 1 according to this embodiment, the rapid feed operation can be achieved more quickly for the retraction of the feed drive system in the drilling than in the non-drilling as described above. Therefore, the slow feed period or the stagnant time of the drill can be reduced when the feed direction of the feed drive system is reversed. As a result, the drill edge is kept in friction contact with the bottom of a drilled hole for a shorter period of time, whereby the drill life can be extended and the machining time can be reduced.

Figure 2:
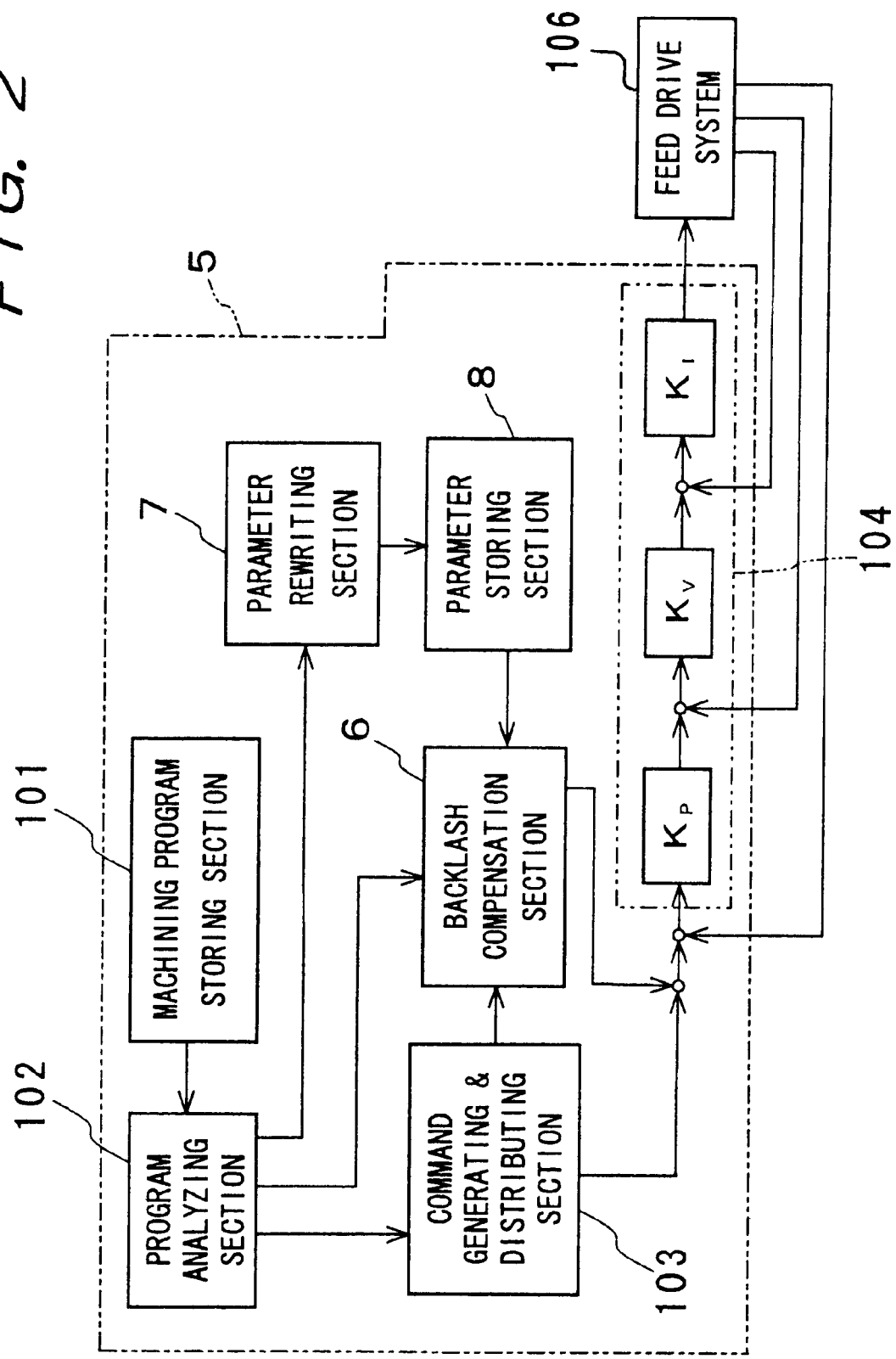
FIG. 2 is a block diagram illustrating a controller to be employed for implementing a control method according to a modification of the first embodiment.

In general, the feed drive system 106 includes a feed mechanism having a ball screw thread and a ball nut. Where the controller is directed to high precision of the contouring control, the controller has the function of compensating for a backlash between the ball screw thread and the ball nut. With this function, a backlash value is added to a target feed position generated as an operation command signal by the command generating and distributing section 103 when the feed direction of the feed drive system 106 is reversed from one direction to the other direction, whereby the feed drive system 106 is moved in excess by the backlash value. Therefore, the aforesaid operation modification process can be performed by utilizing the backlash compensating function. FIG. 2 illustrates a controller which is capable of performing the operation modification process by utilizing the backlash compensating function.

As shown in FIG. 2, the controller 5 includes a machining program storing section 101, a program analyzing section 102, a command generating and distributing section 103, a feed drive controlling section 104, a backlash compensation section 6, a parameter rewriting section 7 and a parameter storing section 8. The machining program storing section 101, the program analyzing section 102, the command generating and distributing section 103 and the feed drive controlling section 104 have the same constructions as those described above.

The parameter storing section 8 stores a predetermined backlash compensation value. The backlash compensation section 6 is adapted to read the backlash compensation value from the parameter storing section 8 upon recognition of an operation command which is generated by the command generating and distributing section 103 for commanding to reverse the feed direction of a feed drive system 106, to add the backlash compensation value to an operation command signal generated by the command generating and distributing section 103, and to input the resulting operation command signal to the drive controlling section 104. The backlash compensation section 6 and the parameter storing section 8 serve for the backlash compensating function.

The parameter rewriting section 7 enables the aforesaid operation modification process. More specifically, the parameter rewriting section 7 is adapted to rewrite or replace the backlash compensation value with the operation modification value (which is greater than the backlash compensation value) in the parameter storing section 8 upon recognition of the drilling start command picked out by the program analyzing section 102, and to rewrite again the operation modification value with the original backlash compensation value upon recognition of the drilling termination command picked out by the program analyzing section 102.

Figure 3:
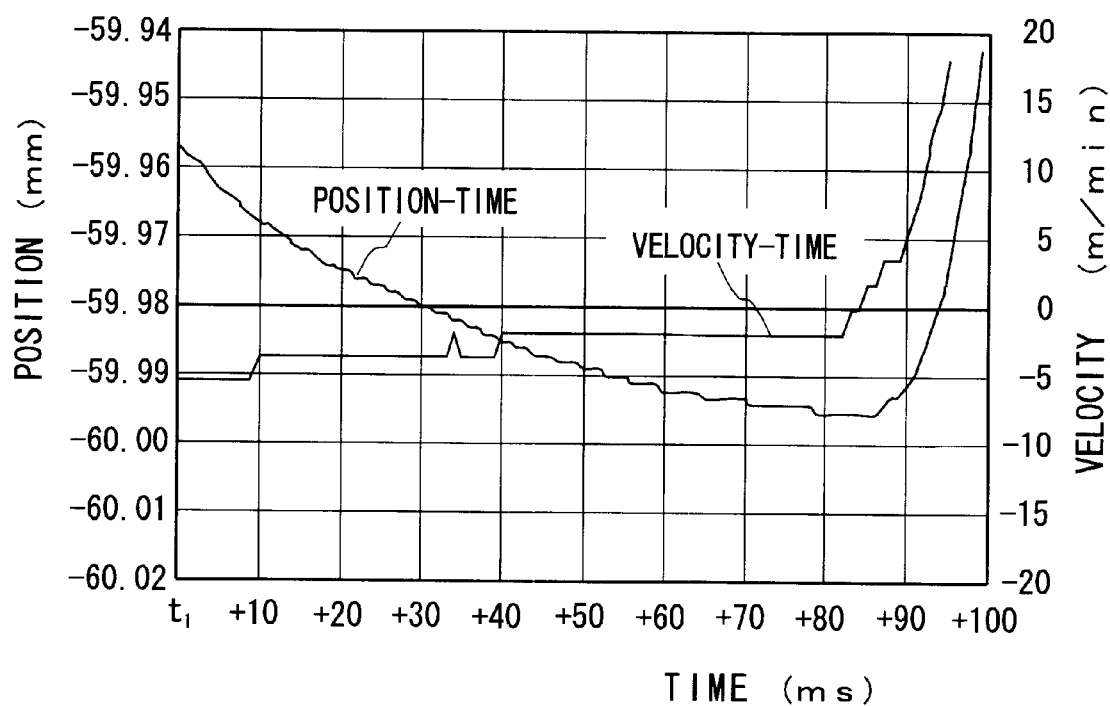
FIGS. 3 and 4 are graphs for explaining effects provided by the controller shown in FIG. 2.
Figure 4:
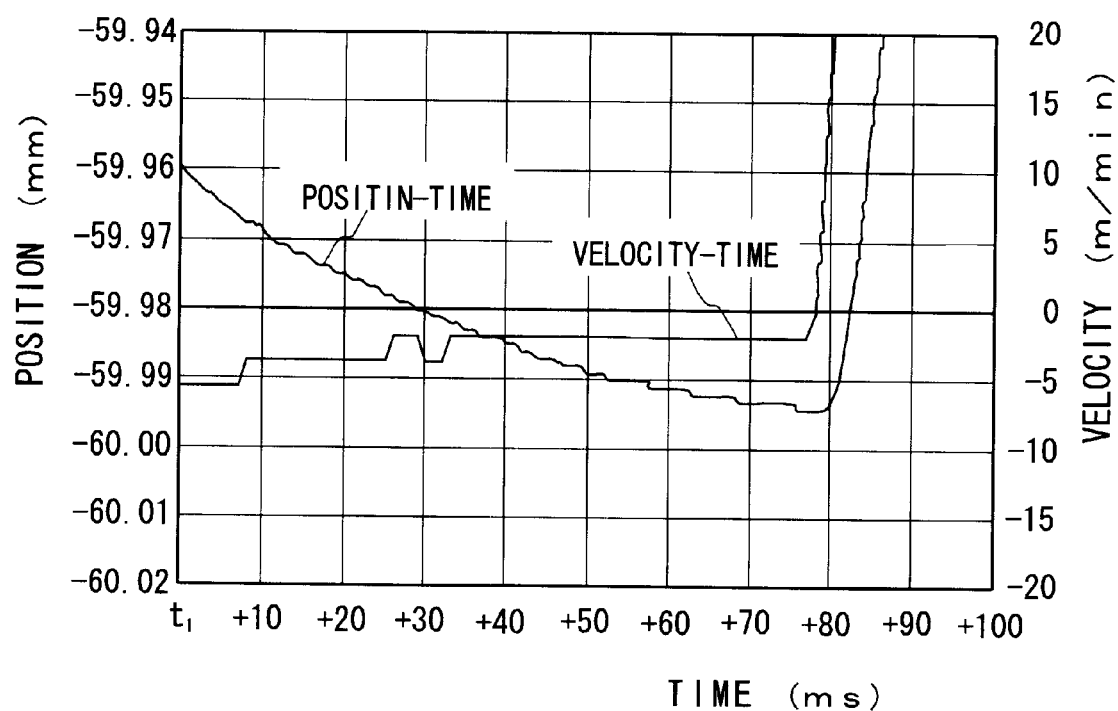

In the controller 5, the feed drive system 106 is controlled to be moved in excess by the backlash value by the backlash compensation section 6 for elimination of the backlash when the feed direction of the feed drive system 106 is reversed in the non-drilling. When the feed drive system 106 is retracted from the bottom of a drilled hole in the drilling, the feed drive system 106 is controlled to be moved in excess by the operation modification value rewritten by the parameter rewriting section 7. FIG. 3 is a graph illustrating fluctuations in the feed rate of the feed drive system 106 and the position of the drill edge observed in the vicinity of the bottom of the drilled hole when the driving operation is compensated with the backlash value (in this case 0 µm) stored in the parameter storing section 8, and FIG. 4 is a graph illustrating fluctuations in the feed rate of the feed drive system 106 and the position of the drill edge observed in the vicinity of the bottom of the drilled hole when the driving operation is modified with the operation modification value (in this case 300 µm) rewritten by the parameter rewriting section 7. As can be seen from these graphs, the feed drive system 106 is retracted from the bottom of the hole at a higher acceleration, and the stagnant time of the drill in the bottom of the hole is reduced by modifying the operation command signal with the greater operation modification value.

In the controller 5, the rapid feed operation can be performed at a higher speed for the retraction of the feed drive system 106 in the drilling than in the non-drilling as in the controller 1. Therefore, the slow feed period or the stagnant time of the drill can be reduced when the feed direction is reversed. As a result, the drill edge is in friction contact with the bottom of the drilled hole for a shorter period of time, whereby the drill life can be extended and the machining time can be reduced.

To demonstrate the effects of the control method of this embodiment, the following test was performed. With the use of a coated carbide solid drill with an oil hole (MDW085MHK available from Sumitomo Denko Co., Ltd.) having a diameter of 8.5 mm, a workpiece of FC250 was drilled at a cutting speed of 150 m/min at a feed rate of 0.4 mm/min for formation of holes each having a depth of 26.5 mm. Where the backlash compensation process was performed with a backlash compensation value of 0 µm (which is equivalent to a case where the operation modification process was not performed), the drill life was expired when 312 holes were formed through the drilling. On the contrary, where the operation modification process was performed with an operation modification value of 300 µm, the drill life was expired when 624 holes were formed through the drilling. Thus, the control method of this embodiment extended the drill life.

Figure 5:
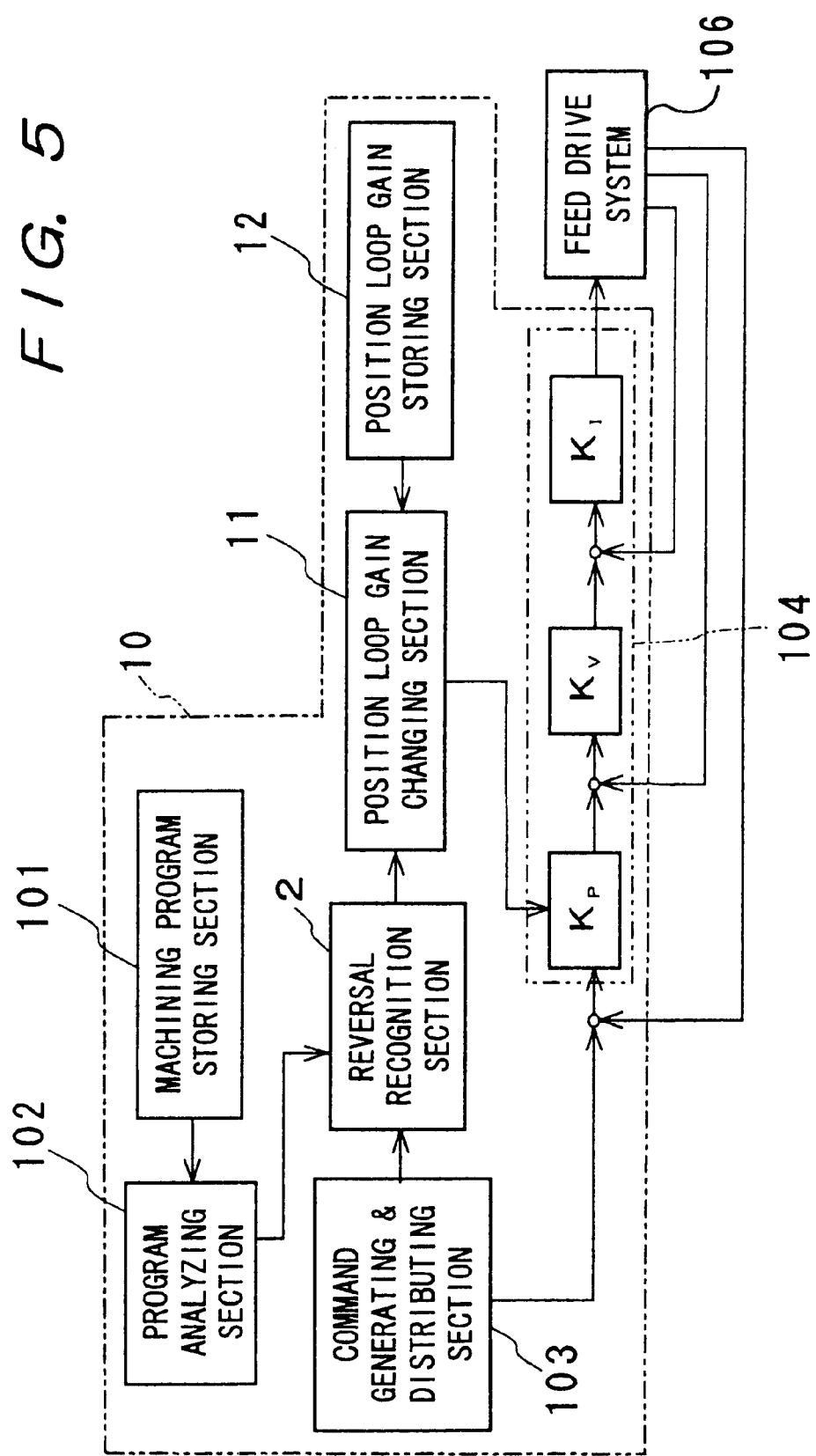
FIG. 5 is a block diagram illustrating a controller to be employed for implementing a control method according to a second embodiment of the present invention.

Next, an explanation will be given to a second embodiment of the present invention. FIG. 5 is a block diagram schematically illustrating the construction of a controller to be employed for implementing a control method according to the second embodiment. As shown, the controller 10 according to this embodiment includes a machining program storing section 101, a program analyzing section 102, a command generating and distributing section 103, a feed drive controlling section 104, a reversal recognition section 2, a position loop gain changing section 11, and a position loop gain storing section 12. The machining program storing section 101, the program analyzing section 102, the command generating and distributing section 103, the feed drive controlling section 104 and the reversal recognition section 2, which have the same constructions as those of the controller 1 of FIG. 1 according to the first embodiment, are designated by the same reference characters, and no detailed explanation will be given thereto.

The position loop gain storing section 12 stores a position loop gain $K_p$ for the drilling which is set at a level higher by the greatest possible degree than a position loop gain $K_p$ for the non-drilling. The position loop gain changing section 11 is adapted to read the position loop gain $K_p$ from the position loop gain storing section 12 upon reception of the process implementation signal applied from the reversal recognition section 2 to update the position loop gain $K_p$ for use in the driving operation to be performed by the feed drive controlling section 104, and to reset the updated position loop gain $K_p$ to the original value upon reception of the process cancellation signal applied from the reversal recognition section 2.

In the controller 10, when the command generating and distributing section 103 generates an operation command for commanding to start the retraction of the feed drive system 106 from the bottom of a drilled hole, the process implementation signal is outputted from the reversal recognition section 2 to the position loop gain changing section 11, and the position loop gain $K_p$ to be used by the feed drive controlling section 104 is changed to the position loop gain $K_p$ for the drilling by the position loop gain changing section 11. Thus, the feed drive system 106 is driven to be retracted at a feed rate higher than a rapid feed rate to be employed in the non-drilling. Thus, the controller 10 reduces the stagnant time of the drill when the feed direction of the drill is reversed to the retracting direction, and provides the same effects as provided by the aforesaid controller 1.

Upon completion of every drilling, the process cancellation signal is outputted from the reversal recognition section 2 to the position loop gain changing section 11, and the position loop gain $K_p$ to be used by the feed drive controlling section 104 is reset to the original value by the position loop gain changing section 11.

Figure 6:
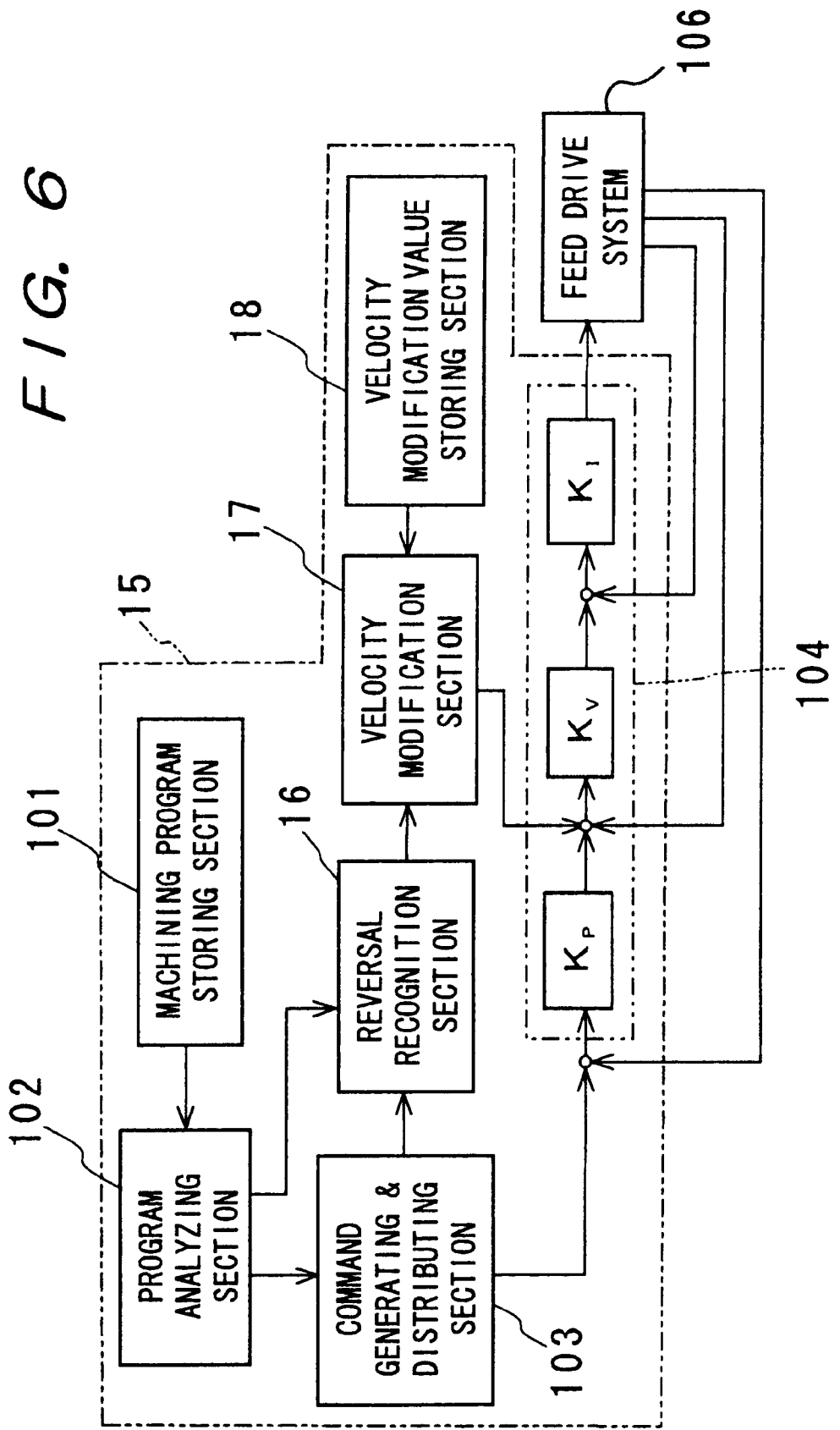
FIG. 6 is a block diagram illustrating a controller to be employed for implementing a control method according to a third embodiment of the present invention.

Next, an explanation will be given to a third embodiment of the present invention. FIG. 6 is a block diagram schematically illustrating the construction of a controller to be employed for implementing a control method according to the third embodiment. As shown, the controller 15 according to this embodiment includes a machining program storing section 101, a program analyzing section 102, a command generating and distributing section 103, a feed drive controlling section 104, a reversal recognition section 16, a velocity modification section 17, and a velocity modification value storing section 18. The machining program storing section 101, the program analyzing section 102, the command generating and distributing section 103 and the feed drive controlling section 104, which have the same constructions as those of the controller 1 of FIG. 1 according to the first embodiment, are designated by the same reference characters, and no detailed explanation will be given thereto.

The reversal recognition section 16 is adapted to start an operation modification process upon recognition of the drilling start command picked out by the program analyzing section 102, to output a process implementation signal to the operation modification section 3 upon recognition of an operation command which is generated by the command generating and distributing section 103 for commanding to start the retraction of a feed drive system 106, and to end the operation modification process upon recognition of the drilling termination command picked out by the program analyzing section 102.

The velocity modification value storing section 18 stores a predetermined velocity modification value. The velocity modification section 17 is adapted to read the velocity modification value from the velocity modification value storing section 18 upon reception of the process implementation signal applied from the reversal recognition section 16, and to input the velocity modification value to the feed drive controlling section 104 in which the velocity modification value is added to a velocity command signal generated by multiplying an operation command signal by the position loop gain $K_p$ for modification of the velocity command signal.

In the controller 15, when the command generating and distributing section 103 generates the operation command for commanding to start the retraction of the feed drive system 106 from the bottom of a drilled hole, the process implementation signal is outputted from the reversal recognition section 16 to the velocity modification section 17. Upon reception of the process implementation signal, the velocity modification section 17 adds the velocity modification value to the velocity command signal generated by the feed drive controlling section 104 for the modification of the velocity command signal. In the feed drive controlling section 104, a drive command signal is generated on the basis of the modified velocity command signal. The operation of the feed drive system 106 is controlled on the basis of the drive command signal thus generated. Accordingly, the feed drive system 106 is driven to be retracted at a feed rate higher than the rapid feed rate to be employed in the non-drilling, so that the stagnant time of the drill can be reduced when the feed direction is reversed to the retracting direction. Thus, the controller 15 provides the same effects as those provided by the aforesaid controller 1.

Figure 7:
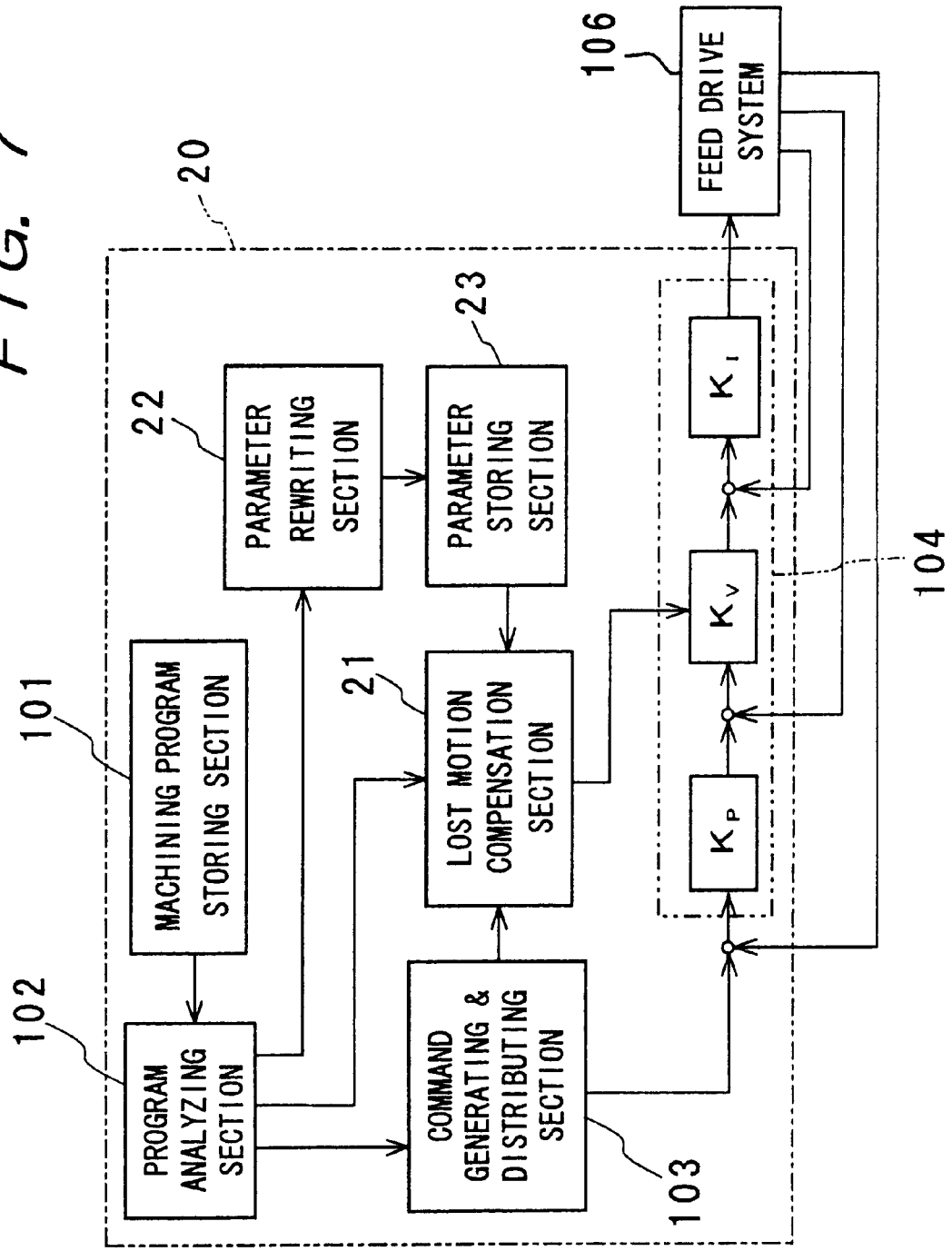
FIG. 7 is a block diagram illustrating a controller to be employed for implementing a control method according to a modification of the third embodiment.

In the meanwhile, a known problem associated with a feed drive system of a common machine tool is that a projection is liable to be formed on a workpiece due to an error occurring in positional control at the change over of a quadrant during an arc cutting operation. The positional control error is supposedly attributable to a delay in generation of a torque of a servo motor for overcoming a static friction generated at the reversal of the feed direction of the feed drive system due to the frictional resistance of the feed drive system. A similar error is caused by a lost motion which occurs due to torsion of a ball screw. Therefore, a controller which is directed to high precision of contouring control has a compensation function (so-called lost motion compensation function) for temporarily increasing the feed rate of the feed drive system 106 at the reversal of the feed direction to eliminate the follow-up delay. This function is realized by adding a compensation value to a velocity command signal or temporarily increasing a velocity loop gain to increase the feed rate of the feed drive system 106 when the feed direction of the feed drive system 106 is reversed from one direction to the other direction. The aforesaid process for adding the modification value to the velocity command signal can be performed by utilizing the lost motion compensation function. FIG. 7 illustrates a controller which is capable of performing this process by utilizing the lost motion compensation function.

As shown in FIG. 7, the controller 20 includes a machining program storing section 101, a program analyzing section 102, a command generating and distributing section 103, a feed drive controlling section 104, a lost motion compensation section 21, a parameter rewriting section 22 and a parameter storing section 23. The machining program storing section 101, the program analyzing section 102, the command generating and distributing section 103 and the feed drive controlling section 104 have the same constructions as those described above.

The parameter storing section 23 stores a predetermined lost motion compensation value. The lost motion compensation section 21 is adapted to read the compensation value from the parameter storing section 23 upon recognition of an operation command which is generated by the command generating and distributing section 103 for commanding to reverse the feed direction of the feed drive system 106, and to input the compensation value to the drive controlling section 104, in which the compensation value is added to a velocity command signal generated therein.

The parameter rewriting section 22 is adapted to rewrite the lost motion compensation value stored in the parameter storing section 23 with a lost motion compensation value for the drilling which is set higher by the greatest possible degree than a lost motion compensation value for the non-drilling upon recognition of the drilling start command picked out by the program analyzing section 102, and to rewrite again the lost motion compensation value with the original value upon recognition of the drilling termination command picked out by the program analyzing section 102.

Figure 8:
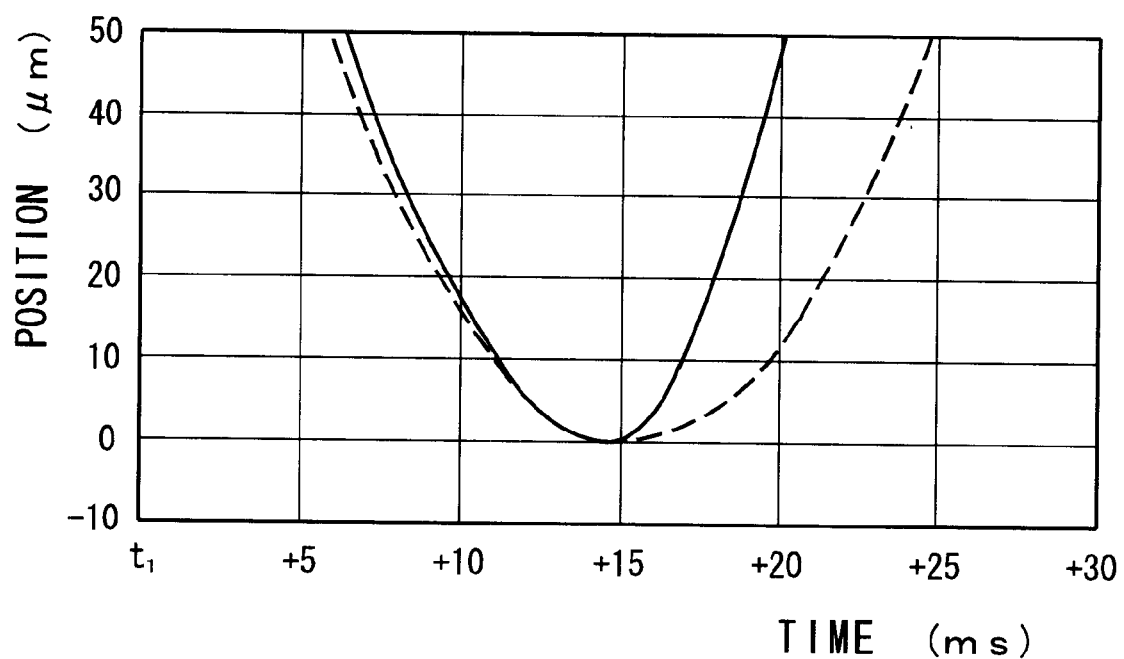
FIG. 8 is a graph for explaining effects provided by the controller shown in FIG. 7.

In the controller 20, the lost motion compensation section 21 increases the feed rate of the feed drive system 106 by adding the lost motion compensation value to the velocity command signal for elimination of stick-slip and the lost motion whenever the feed direction of the feed drive system 106 is reversed in the non-drilling. When the feed drive system 106 is retracted from the bottom of a drilled hole in the drilling, the feed drive system 106 is driven on the basis of the lost motion compensation value for the drilling rewritten by the parameter rewriting section 22 thereby to reach the rapid feed rate more quickly than in the non-drilling. FIG. 8 is a graph illustrating a fluctuation in the position of the drill observed in the vicinity of the bottom of the drilled hole when the feed operation is feedback-controlled by a servo motor with a lost motion compensation value of 0 (broken line) and a fluctuation in the position of the drill observed in the vicinity of the bottom of the drilled hole when the feed operation is feedback-controlled by a servo motor with a lost motion compensation value of 100 rewritten by the parameter rewriting section 22 (solid line). As can be seen from the FIG. 8, the feed drive system 106 can be retracted from the bottom of the hole at a higher acceleration, and the stagnant time of the drill in the bottom of the hole is reduced by employing the greater lost motion compensation value.

In the controller 20, the rapid feed operation can be performed at a higher feed rate for the retraction of the feed drive system 106 in the drilling than in the non-drilling as in the controller 1. Therefore, the slow feed period or the stagnant time of the drill can be reduced when the feed direction of the drill is reversed. As a result, the period, when the drill edge is in friction contact with the bottom of the drilled hole, is short, whereby the drill life can be extended and the machining time can be reduced.

To demonstrate the effects of the control method of this embodiment, the following test was performed. With the use of a coated carbide solid drill with an oil hole (MDW085MHK available from Sumitomo Denko Co., Ltd.) having a diameter of 8.5 mm, a workpiece of ADC12 was drilled at a cutting speed of 500 m/min at a feed rate of 0.5 mm/min for formation of holes each having a depth of 25.5 mm. Where the feed drive system was controlled with a lost motion compensation value of 0 at the reversal thereof, the drill life was expired when 208 holes were formed through the drilling. On the contrary, where the feed drive system was controlled with a lost motion compensation value of 100 at the reversal thereof, the drill life was expired when 312 holes were formed through the drilling. Thus, the control method of this embodiment extends the drill life.

Figure 9:
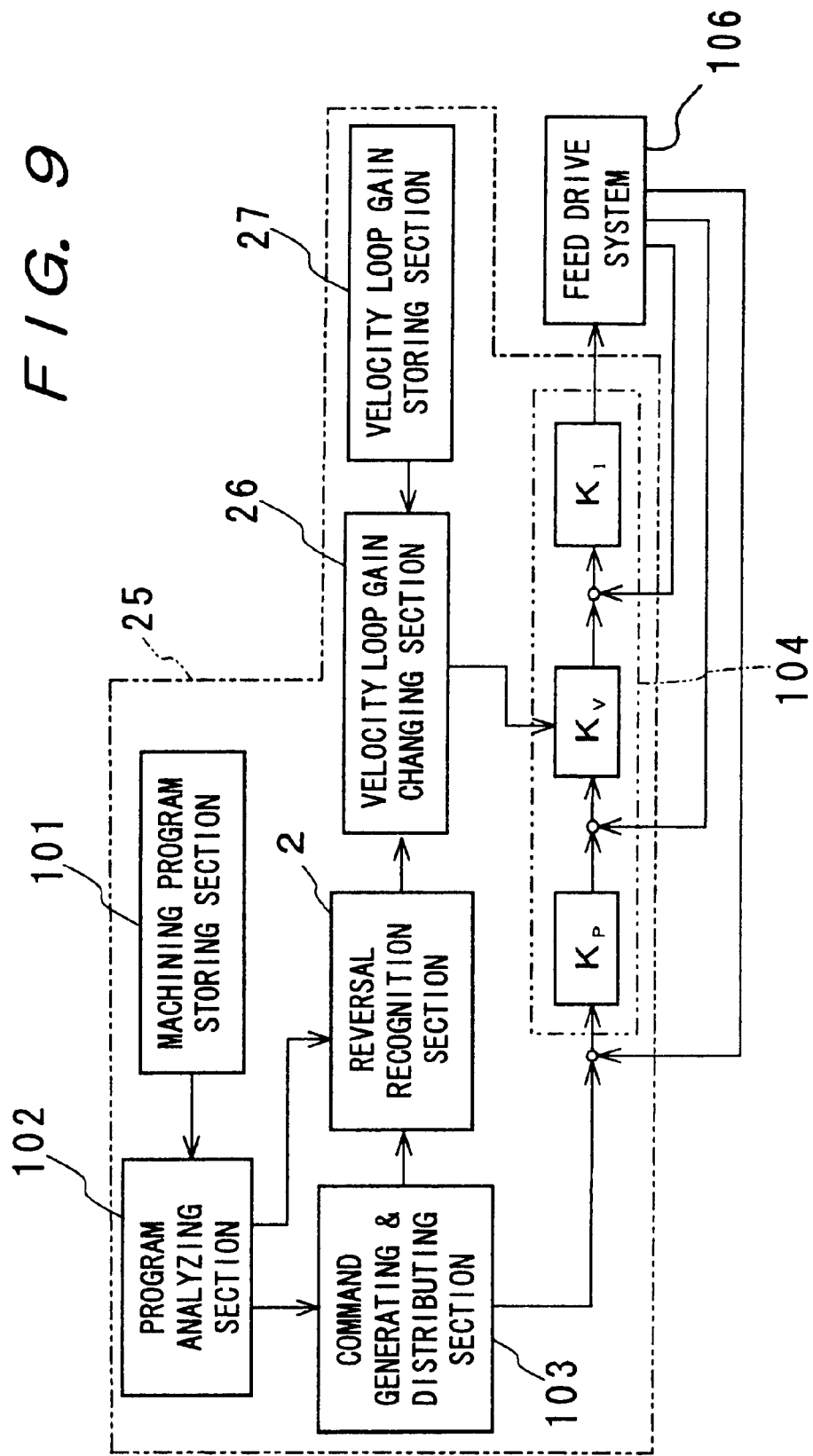
FIG. 9 is a block diagram illustrating a controller to be employed for implementing a control method according to a fourth embodiment of the present invention.

Next, an explanation will be given to a fourth embodiment of the present invention. FIG. 9 is a block diagram schematically illustrating the construction of a controller to be employed for implementing a control method according to the fourth embodiment. The controller 25 according to this embodiment includes a machining program storing section 101, a program analyzing section 102, a command generating and distributing section 103, a feed drive controlling section 104, a reversal recognition section 2, a velocity loop gain changing section 26, and a velocity loop gain storing section 27. The machining program storing section 101, the program analyzing section 102, the command generating and distributing section 103, the feed drive controlling section 104 and the reversal recognition section 2, which have the same constructions as those of the controller 1 of FIG. 1 according to the first embodiment, are designated by the same reference characters, and no detailed explanation will be given thereto.

The velocity loop gain storing section 27 stores a velocity loop gain $K_v$, for the drilling which is set at a level higher by the greatest possible degree than a velocity loop gain $K_v$ for the non-drilling. The velocity loop gain changing section 26 is adapted to read the velocity loop gain $K_v$ from the velocity loop gain storing section 27 upon reception of a process implementation signal applied from the reversal recognition section 2 to update the velocity loop gain $K_v$ for use in the process to be performed by the feed drive controlling section 104, and to reset the updated velocity loop gain $K_v$ to the original value upon reception of a process cancellation signal applied from the reversal recognition section 2.

In the controller 25, when the command generating and distributing section 103 generates an operation command for commanding to start the retraction of the feed drive system 106 from the bottom of a drilled hole, the process implementation signal is outputted from the reversal recognition section 2 to the velocity loop gain changing section 26, and the velocity loop gain $K_v$ to be used by the feed drive controlling section 104 is changed to the velocity loop gain $K_v$ for the drilling by the velocity loop gain changing section 26. Thus, the feed drive system 106 is driven to be retracted at a feed rate higher than the rapid feed rate for the non-drilling. Therefore, the controller 25 reduces the stagnant time of the drill when the feed direction of the drill is reversed to the retracting direction, and provides the same effects as those provided by the aforesaid controller 1.

Upon completion of every drilling, the process cancellation signal is outputted from the reversal recognition section 2 to the velocity loop gain changing section 26, and the velocity loop gain $K_v$ to be used by the feed drive controlling section 104 is reset to the original value by the velocity loop gain changing section 26.

Figure 10:
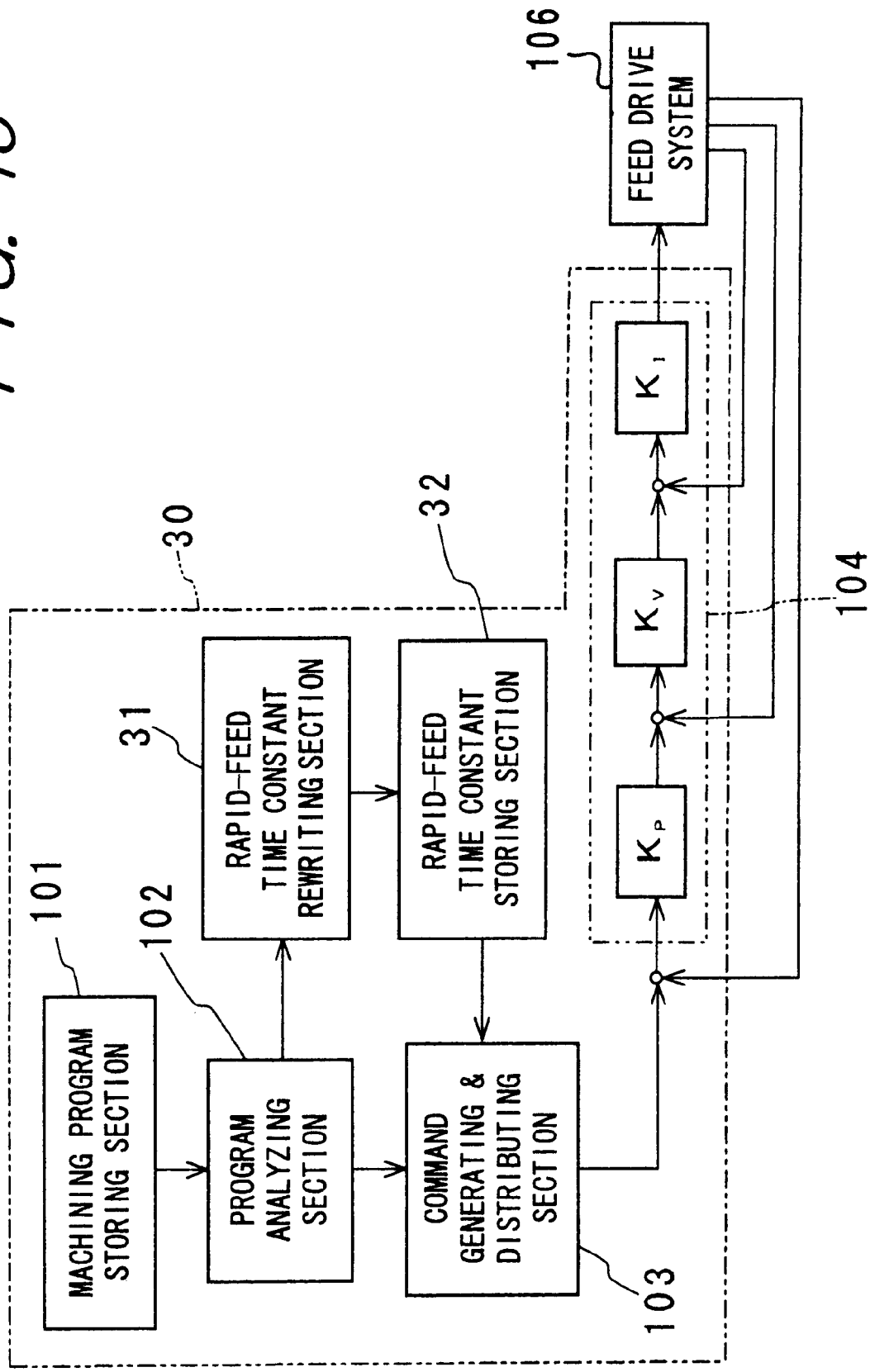
FIG. 10 is a block diagram illustrating a controller to be employed for implementing a control method according to a fifth embodiment of the present invention.

Next, an explanation will be given to a fifth embodiment of the present invention. FIG. 10 is a block diagram schematically illustrating the construction of a controller to be employed for implementing a control method according to the fifth embodiment. As shown, the controller 30 includes a machining program storing section 101, a program analyzing section 102, a command generating and distributing section 103, a feed drive controlling section 104, a rapid-feed time constant rewriting section 31 and a rapid-feed time constant storing section 32. The machining program storing section 101, the program analyzing section 102, the command generating and distributing section 103 and the feed drive controlling section 104, which have the same constructions as those of the controller 1 of FIG. 1 according to the first embodiment, are designated by the same reference characters, and no detailed explanation will be given thereto.

The rapid-feed time constant storing section 32 stores a time constant to be employed when the command generating and distributing section 103 determines a target feed position of the feed drive system 106 for a rapid feed operation. The command generating and distributing section 103 is adapted to calculate the target feed position for the rapid feed operation on the basis of the time constant stored in the rapid-feed time constant storing section 32. High-speed and high-acceleration machine tools generally employ a bell-shaped time constant as shown in FIG. 11 to alleviate a shock exerted at the start of the driving of a feed drive system.

Figure 11:
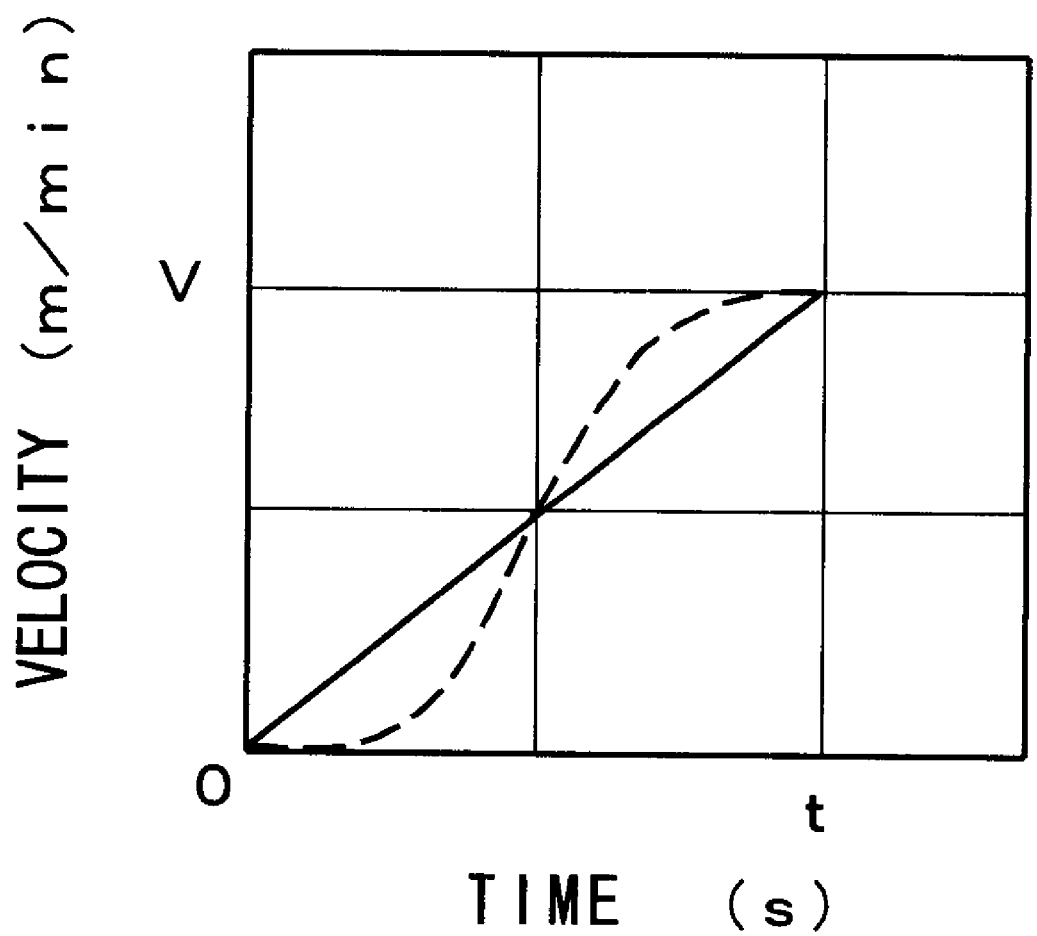
FIG. 11 is a graph for explaining effects provided by the controller shown in FIG. 10.

The rapid-feed time constant rewriting section 31 stores a bell-shaped time constant (which provides an acceleration-deceleration pattern indicated by a broken line in FIG. 11) and a linear time constant (which provides an acceleration pattern indicated by a solid line in FIG. 11), and is adapted to rewrite the time constant stored in the rapid-feed time constant storing section 32 with the linear time constant upon recognition of the drilling start command picked out by the program analyzing section 102, and to rewrite again the linear time constant with the bell-shaped time constant upon recognition of the drilling termination command picked out by the program analyzing section 102.

In the controller 30, the time constant stored in the rapid-feed time constant storing section 32 is rewritten with the linear time constant by the rapid-feed time constant rewriting section 31 when the drilling start command is picked out by the program analyzing section 102, and the rapid feed operation of the feed drive system 106 is controlled on the basis of the linear time constant. With the linear time constant, the feed drive system 106 is controlled to reach the rapid teed rate more quickly than with the bell-shaped time constant as shown in FIG. 11. Therefore, the feed drive system 106 is driven to be retracted at a feed rate higher than the rapid feed rate in the non-drilling, and the stagnant time of the drill can be reduced when the feed direction of the drill is reversed to the retracting direction. Thus, the controller 30 provides the same effects as those provided by the aforesaid controller 1.

Figure 12:
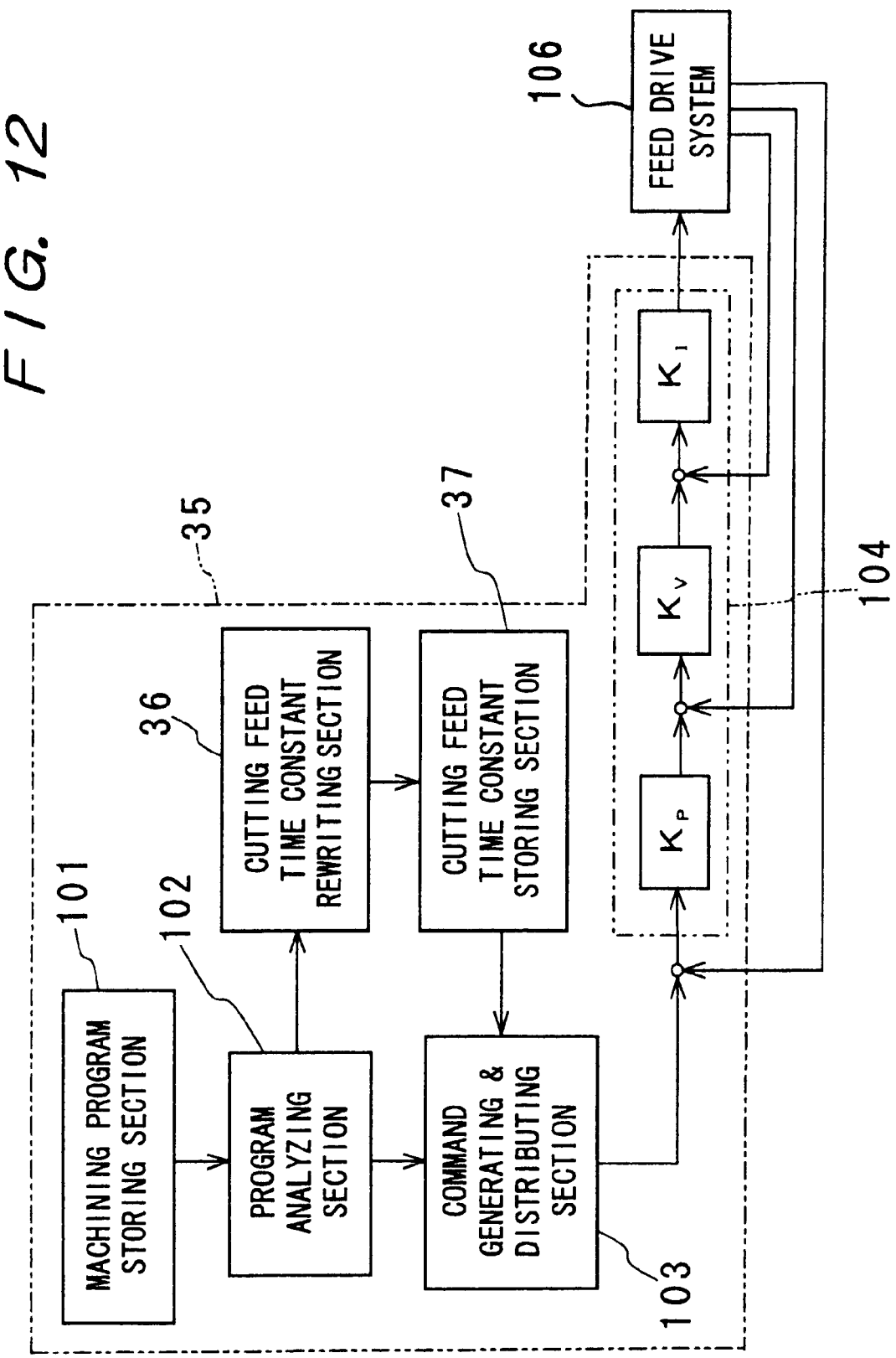
FIG. 12 is a block diagram illustrating a controller to be employed for implementing a control method according to a sixth embodiment of the present invention.

Next, an explanation will be given to a sixth embodiment of the present invention. FIG. 12 is a block diagram schematically illustrating the construction of a controller to be employed for implementing a control method according to the sixth embodiment. As shown, the controller 35 includes a machining program storing section 101, a program analyzing section 102, a command generating and distributing section 103, a feed drive controlling section 104, a cutting feed time constant rewriting section 36 and a cutting feed time constant storing section 37. The machining program storing section 101, the program analyzing section 102, the command generating and distributing section 103 and the feed drive controlling section 104, which have the same constructions as those of the controller 1 of FIG. 1 according to the first embodiment, are designated by the same reference characters, and no detailed explanation will be given thereto.

The cutting feed time constant storing section 37 stores a time constant to be employed when the command generating and distributing section 103 determines a target feed position of the feed drive system 106 for a cutting feed operation. The command generating and distributing section 103 is adapted to calculate the target feed position for the cutting feed operation on the basis of the time constant stored in the cutting feed time constant storing section 37. The cutting feed time constant is generally set at a level optimized for the precision in the desired contour.

The cutting feed time constant rewriting section 36 stores a time constant set at such a level that the feed drive system 106 is accelerated or decelerated at the highest possible rate for the drilling, and is adapted to rewrite the time constant stored in the cutting feed time constant storing section 37 with the cutting feed time constant for the drilling upon recognition of the drilling start command picked out by the program analyzing section 102, and to rewrite again the time constant with the original time constant upon recognition of the drilling termination command picked out by the program analyzing section 102.

In the controller 35, the time constant stored in the cutting feed time constant storing section 36 is rewritten with the time constant for the drilling by the cutting feed time constant rewriting section 37 when the drilling start command is picked out by the program analyzing section 102, and the drilling feed operation of the feed drive system 106 is controlled on the basis of the time constant for the drilling. The feed drive system 106 is decelerated at a high deceleration rate corresponding to the time constant for the drilling when the feed drive system 106 reaches the bottom of a drilled hole, so that the stagnant time of the drill in the bottom of the hole can be reduced. Thus, the controller 35 provides the same effects as those provided by the aforesaid controller 1.

Figure 13:
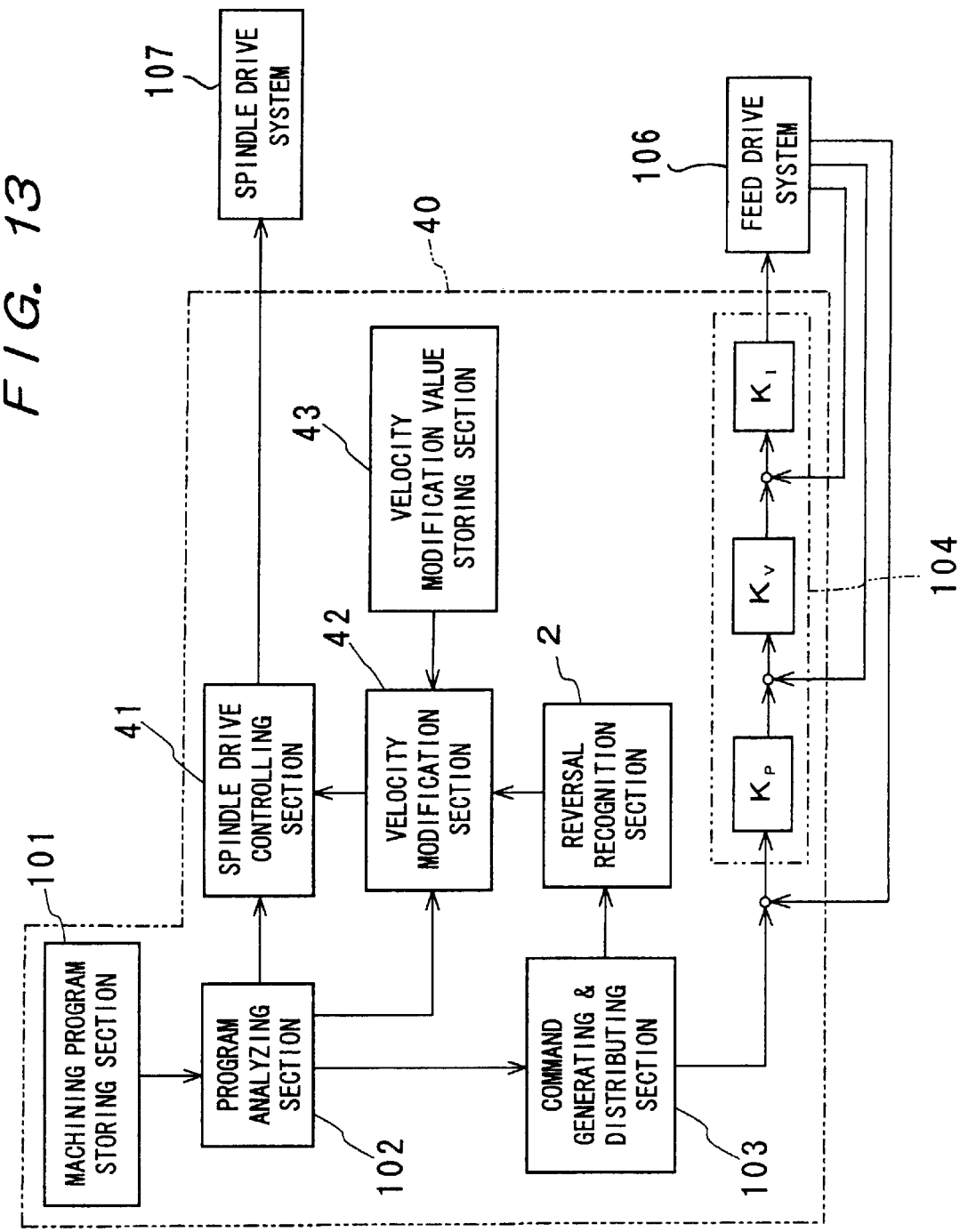
FIG. 13 is a block diagram illustrating a controller to be employed for implementing a control method according to a seventh embodiment of the present invention.
Figure 14:
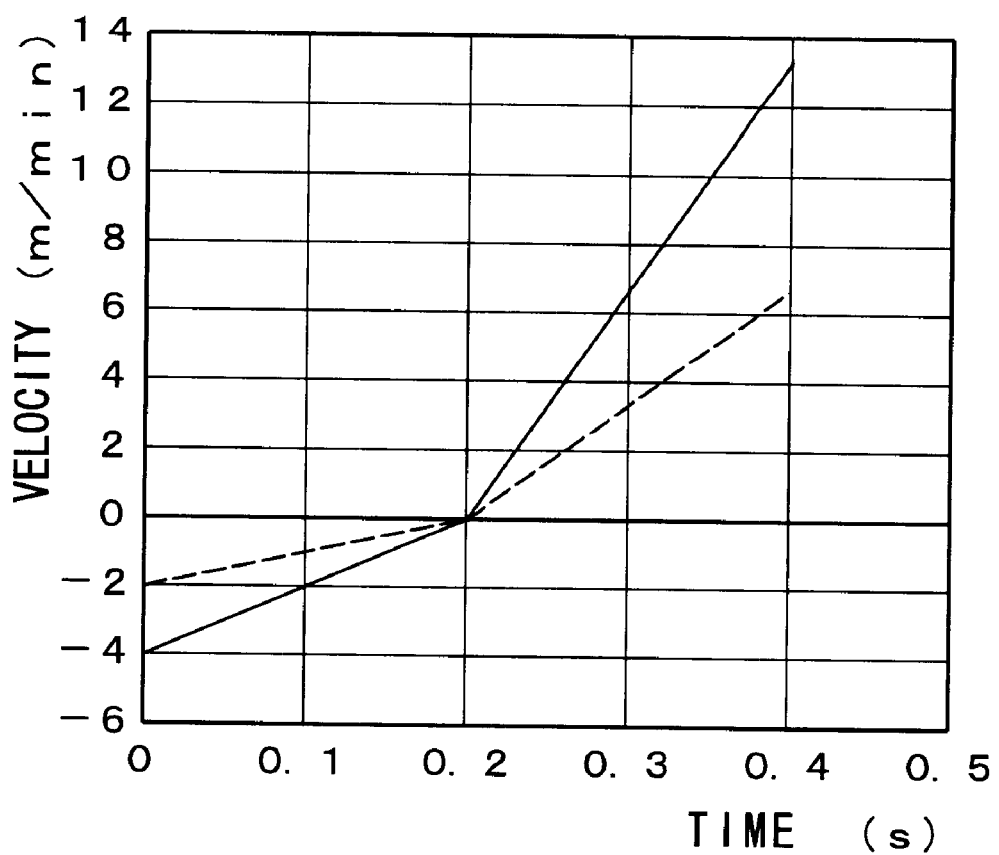
FIG. 14 is a graph for explaining fluctuations in feed rate measured in the vicinity of the bottom of a drilled hole during a drilling performed according to a conventional control method.
Figure 15:
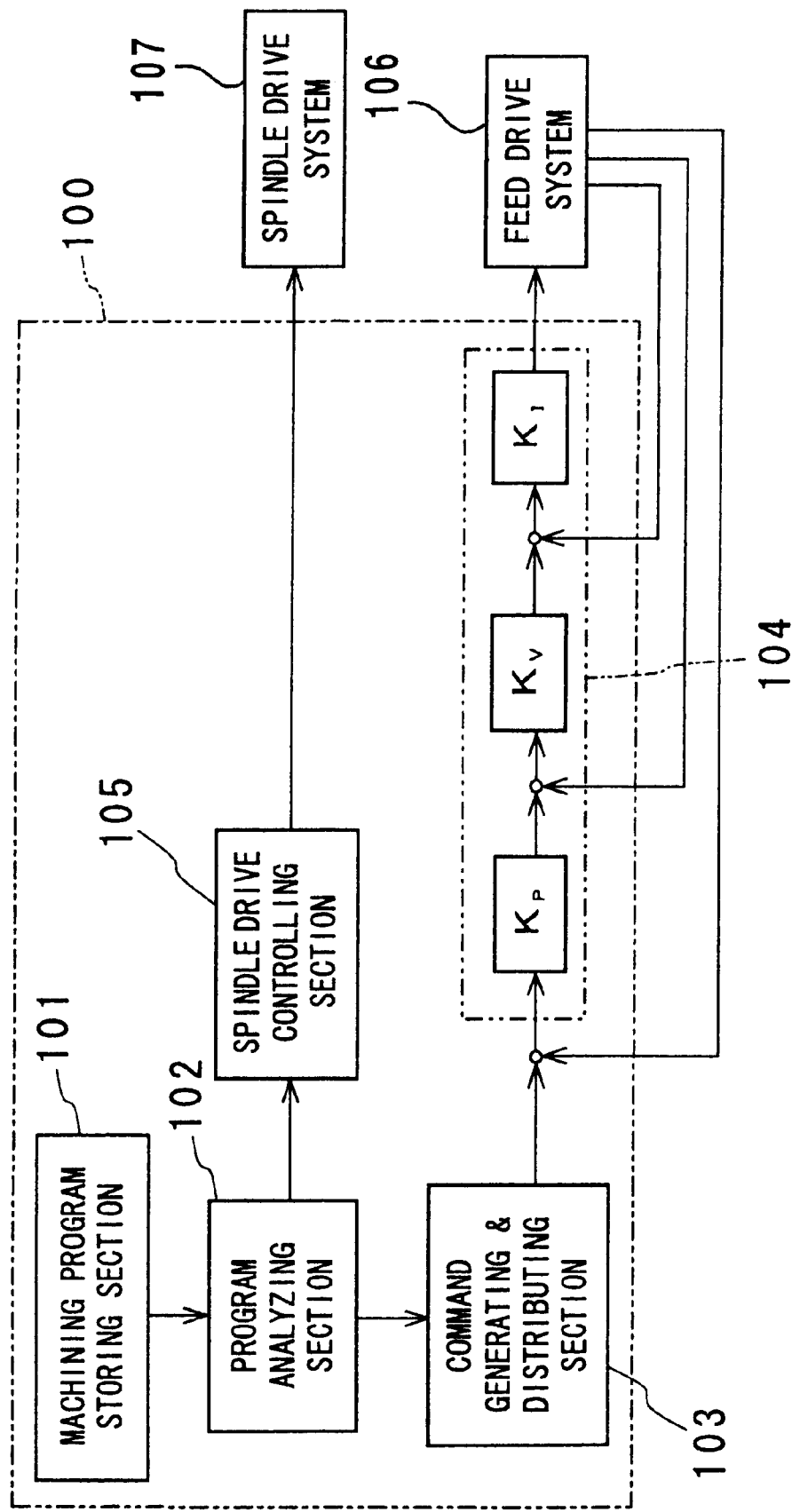
FIG. 15 is a block diagram illustrating a conventional controller for controlling an NC machine tool.

Next, an explanation will be given to a seventh embodiment of the present invention. FIG. 13 is a block diagram schematically illustrating the construction of a controller to be employed for implementing a control method according to the seventh embodiment. As shown, the controller 40 according to this embodiment includes a machining program storing section 101, a program analyzing section 102, a command generating and distributing section 103, a feed drive controlling section 104, a reversal recognition section 2, a spindle drive controlling section 41, a velocity modification section 42, and a velocity modification value storing section 43. The machining program storing section 101, the program analyzing section 102, the command generating and distributing section 103, the feed drive controlling section 104 and the reversal recognition section 2, which have the same constructions as those of the controller 1 of FIG. 1 according to the first embodiment, are designated by the same reference characters, and no detailed explanation will be given thereto.

The velocity modification value storing section 43 stores a deceleration value as a modification value set at such a level that the speed of the spindle drive system 107 is reduced as much as possible. The velocity modification section 42 is adapted to read the deceleration value from the velocity modification value storing section 43 to input the deceleration value to the spindle drive controlling section 41 upon reception of a process implementation signal applied from the reversal recognition section 2, and to input a command to the spindle drive controlling section 41 to cancel a deceleration process or increase the speed of the spindle drive system 107 by a value equivalent to the deceleration value upon reception of a process cancellation signal applied from the reversal recognition section 2. The spindle drive controlling section 41 is adapted to control and drive the spindle drive system 107 on the basis of a signal received from the program analyzing section 102, and to accelerate or decelerate the rotation speed of the spindle drive system 107 on the basis of the acceleration or deceleration value received from the velocity modification section 42.

In the controller 40, when the command generating and distributing section 103 generates an operation command for commanding to start the retraction of the feed drive system 106, the process implementation signal is outputted from the reversal recognition section 2 to the velocity modification section 42. Upon reception of the process implementation signal, the deceleration value is read out of the velocity modification storing section 43 by the velocity modification section 42, and outputted to the spindle drive controlling section 41. The spindle drive controlling section 41 decelerates the rotation speed of the spindle drive system 107 on the basis of the inputted deceleration value. In the controller 40, the rotation speed of the spindle, i.e., the drill, is thus decelerated when the feed direction of the feed drive system 106 is reversed for the retraction thereof. Therefore, a distance during which the drill edge is kept in friction contact with the bottom of a drilled hole is reduced, whereby the drill life can be extended.

Upon recognition of completion of the retracting operation, the reversal recognition section 2 transmits the process cancellation signal to the velocity modification section 42. Upon reception of the process cancellation signal, the velocity modification section 42 cancels the deceleration process, i.e., inputs a command to the spindle drive controlling section 41 for commanding to increase the rotation speed of the spindle drive system 107 by a value equivalent to the deceleration value. Thus, the rotation speed of the spindle drive system 107 is reset to a rotation speed to be employed for the cutting operation. Upon recognition of the drilling termination command picked out by the program analyzing section 102, the reversal recognition section 2 ends the process.

While the present invention has thus been described in detail by way of the specific embodiments thereof, the embodiments are not intended to limit any other conceivable embodiments of the invention. The aforesaid processes are each implemented alone in the embodiments, but may be implemented in combination.

What is claimed is:

1. A method of controlling an NC machine tool which has a feed drive system and is operative on the basis of a machining program, the control method comprising:

generating an operation command signal on the basis of the machining program and a time constant;

generating a velocity command signal by multiplying a deviation of a present position signal fed back from the feed drive system from the generated operation command signal by a position loop gain;

generating an electric current command signal by multiplying a deviation of a present velocity signal fed back from the feed drive system from the generated velocity command signal by a velocity loop gain; and controlling a drive motor of the feed drive system on the basis of the generated electric current command signal for driving thereof, wherein a machining mode is determined from the machining program and, if the machining mode is a drilling mode, the operation command signal is modified by adding a predetermined operation modification value to the operation command signal, and the generation of the velocity command signal is based on the modified operation command signal when the feed drive system is driven to be retracted opposite to a drilling feed direction.

2. A method of controlling an NC machine tool which has a feed drive system and is operative on the basis of a machining program, the control method comprising:

generating an operation command signal on the basis of the machining program and a time constant;

generating a velocity command signal by multiplying a deviation of a present position signal fed back from the feed drive system from the generated operation command signal by a position loop gain;

generating an electric current command signal by multiplying a deviation of a present velocity signal fed back from the feed drive system from the generated velocity command signal by a velocity loop gain; and controlling a drive motor of the feed drive system on the basis of the generated electric current command signal for driving thereof, wherein a machining mode is determined from the machining program and, if the machining mode is a drilling mode, the velocity command signal is modified by adding a predetermined velocity modification value to the velocity command signal, and the generation of the electric current command signal is based on the modified velocity command signal when the feed drive system is driven to be retracted opposite to a drilling feed direction.

3. A method of controlling an NC machine tool which has a feed drive system and is operative on the basis of a machining program, the control method comprising:

generating an operation command signal on the basis of the machining program and a time constant;

generating a velocity command signal by multiplying a deviation of a present position signal fed back from the feed drive system from the generated operation command signal by a position loop gain;

generating an electric current command signal by multiplying a deviation of a present velocity signal fed back from the feed drive system from the generated velocity command signal by a velocity loop gain; and controlling a drive motor of the feed drive system on the basis of the generated electric current command signal for driving thereof, wherein a machining mode is determined from the machining program and, if the machining mode is a drilling mode, the velocity command signal is modified by employing a position loop gain having a greater value than a position loop gain to be employed in a non-drilling mode, and the generation of the electric current command signal is based on the modified velocity command signal when the feed drive system is driven to be retracted opposite to a drilling feed direction.

4. A method of controlling an NC machine tool which has a feed drive system and is operative on the basis of a machining program, the control method comprising:

generating an operation command signal on the basis of the machining program and a time constant;

generating a velocity command signal by multiplying a deviation of a present position signal fed back from the feed drive system from the generated operation command signal by a position loop gain;

generating an electric current command signal by multiplying a deviation of a present velocity signal fed back from the feed drive system from the generated velocity command signal by a velocity loop gain; and controlling a drive motor of the feed drive system on the basis of the generated electric current command signal for driving thereof, wherein a machining mode is determined from the machining program and, if the machining mode is a drilling mode, the electric current command signal is modified by employing a velocity loop gain having a greater value than a velocity loop gain to be employed in a non-drilling mode, and the modified electric current command signal is employed for the driving control of the drive motor when the feed drive system is driven to be retracted opposite to a drilling feed direction.

5. A method of controlling an NC machine tool which has a feed drive system and is operative on the basis of a machining program, the control method comprising:

generating an operation command signal on the basis of the machining program and a time constant;

generating a velocity command signal by multiplying a deviation of a present position signal fed back from the feed drive system from the generated operation command signal by a position loop gain;

generating an electric current command signal by multiplying a deviation of a present velocity signal fed back from the feed drive system from the generated velocity command signal by a velocity loop gain; and controlling a drive motor of the feed drive system on the basis of the generated electric current command signal for driving thereof, wherein when the feed drive system is driven in the drilling feed direction, a bell-shaped time constant is employed and, when the feed drive system is driven to be retracted opposite to the drilling feed direction, a linear time constant is employed for the generation of the operation command signal.

6. A method of controlling an NC machine tool which has a feed drive system and is operative on the basis of a machining program, the control method comprising:

generating an operation command signal on the basis of the machining program and a time constant;

generating a velocity command signal by multiplying a deviation of a present position signal fed back from the feed drive system from the generated operation command signal by a position loop gain;

generating an electric current command signal by multiplying a deviation of a present velocity signal fed back from the feed drive system from the generated velocity command signal by a velocity loop gain; and controlling a drive motor of the feed drive system on the basis of the generated electric current command signal for driving thereof, wherein when the feed drive system is driven in the drilling feed direction, a time constant having a smaller value than a time constant to be used in a non-drilling mode is employed for the generation of the operation command signal.

* * * * *